United States Patent [19]

Knebl

[11] Patent Number: 4,938,128
[45] Date of Patent: Jul. 3, 1990

[54] APPARATUS FOR FORMING A CONFECTIONARY ROPE HAVING A VISCOUS CENTER

[75] Inventor: Leslie F. Knebl, Morristown, N.J.
[73] Assignee: Warner-Lambert Company, Morris Plains, N.J.
[21] Appl. No.: 265,370
[22] Filed: Oct. 28, 1988
[51] Int. Cl.$^5$ .............................................. A23P 1/00
[52] U.S. Cl. ................... 99/450.6; 99/450.7; 425/130; 425/363
[58] Field of Search ............. 99/352, 353, 355, 450.1, 99/450.2, 450.3, 450.6, 450.7, 450.8; 425/130, 131.1, 133.1, 462, 363, 376 R, 374, 366; 426/282, 284, 514, 516, 517

[56] References Cited

U.S. PATENT DOCUMENTS

| | | | |
|---|---|---|---|
| 3,076,236 | 2/1963 | Labino | 425/130 |
| 3,698,309 | 10/1972 | Steels | 99/450.1 |
| 3,804,637 | 4/1974 | Rejsa | 99/450.1 |
| 4,084,494 | 4/1978 | Ezaki | 99/450.7 |
| 4,461,779 | 7/1984 | Peters | 426/517 |
| 4,504,511 | 3/1985 | Binley | 426/516 |
| 4,569,848 | 2/1986 | Giorgetti et al. | 426/282 |
| 4,648,316 | 3/1987 | Ruffinatti | 99/483 |

Primary Examiner—Timothy F. Simone
Attorney, Agent, or Firm—Daniel A. Scola, Jr.

[57] ABSTRACT

An apparatus and process for forming a center-filled confectionary rope in which the center candy is a candy which, during the forming process, is too viscous to be pumped. A center candy is obtained and formed into a continuous cylindrical shape. This is done by using a feeding miller which extracts from the viscous center candy mass a continuous flow of candy. This continuous flow of candy is introduced into a batch roller which forms the continuous flow of candy into a continuous cylindrical shape. An exterior candy mass is obtained and formed into a continuous rectangular shape. This is accomplished by placing the exterior candy mass in a feeding miller which extracts a continuous flow of the exterior candy mass in the form of a rectangular cross section. The continuous rectangularly shaped exterior candy mass is then attached to the continuous cylindrically shaped viscous candy mass and wrapped around the cylindrical center candy in a helical fashion.

11 Claims, 3 Drawing Sheets

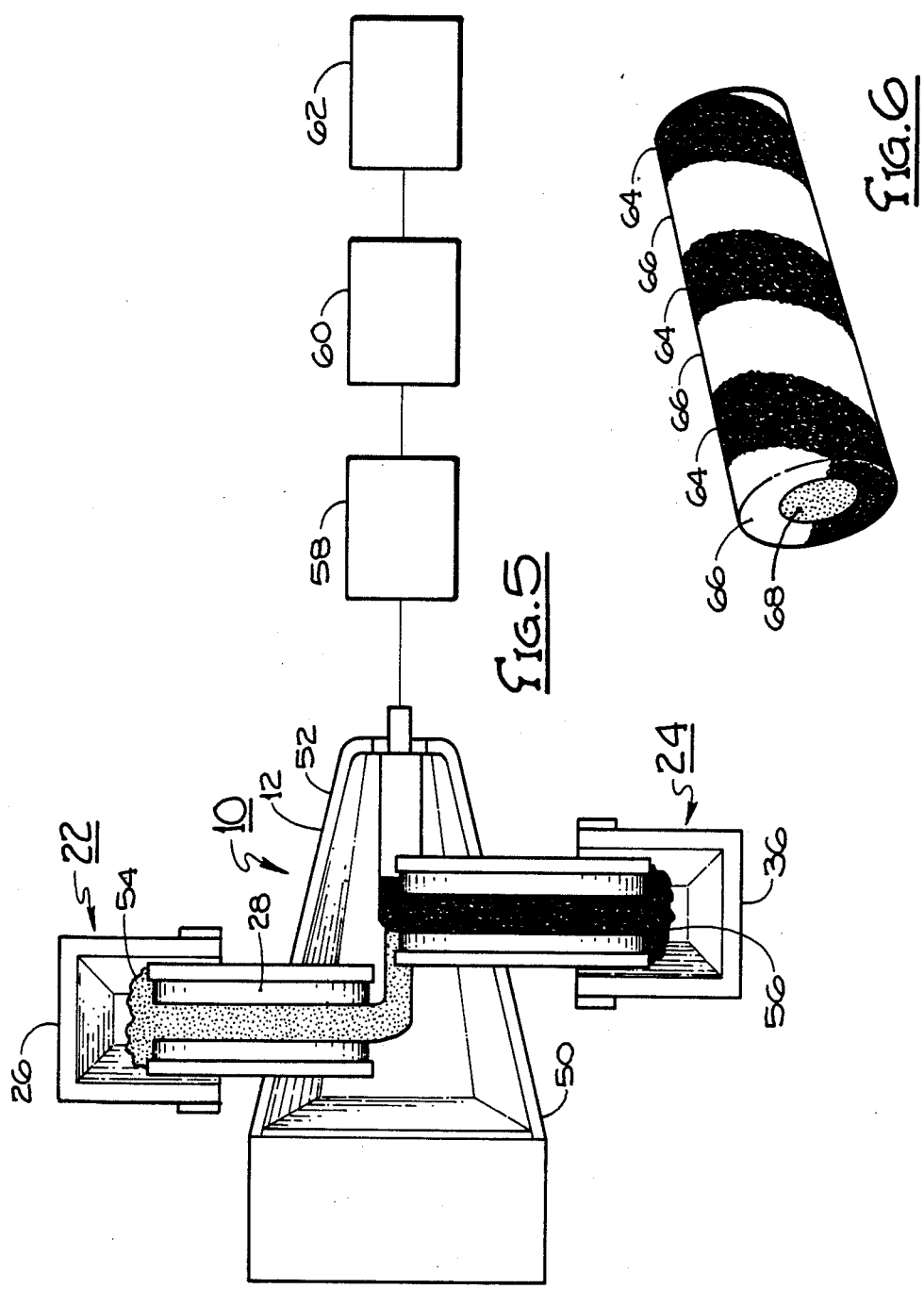

APPARATUS FOR FORMING A CONFECTIONARY ROPE HAVING A VISCOUS CENTER

BACKGROUND

1. Field of the Invention

The present invention relates to a process for forming a center-filled confectionary rope. More particularly, the present invention relates to a process for covering a viscous candy mass with a candy coating by wrapping a layer of candy around the viscous candy center in a helical fashion.

2. The Background of the Invention

Confectionary products are available in a variety of flavors, configurations, sizes, textures, and combinations. In recent years, confectionary products having an outer layer of one flavor, color, or type in combination with an inner layer of a second flavor, color, or type of confection have gained popularity. For example, many companies market chewing gum which has been injected with a sweet liquid or a soft center portion which is heavily flavored. As one chews the gum, the flavor-rich interior is released thereby providing a burst of flavor.

The same concept has been used successfully with various types of candies. Hard candy exteriors are provided with liquid centers, soft candy centers, or hard candy centers of a second flavor. Additionally, those same types of candy centers have been used successfully in combination with an exterior in the form of a flavored gum, a hard candy, or a soft candy, such as caramel. Thus, a wide variety of combinations of confectionary products are available which have as their basic configuration a solid exterior portion with a second portion forming a center. Often this configuration takes the form of a rope of candy.

Confectionary products of this nature can be made by hand by forming a long, rectangularly shaped layer to be used as the exterior. The center is then placed within the rectangularly shaped exterior in a longitudinal direction. The rectangularly shaped exterior layer is then wrapped around the center to form a center-filled confectionary "rope". The rope may be cut into several small pieces to form individual candies, or it may be stretched and folded back on itself several times to form a layered structure.

Although making center-filled candies by hand, as described above, is a popular hobby, making candy by hand is an inadequate method of production when large quantities of candies are needed.

When candy is to be sold commercially, the market generally cannot easily absorb the high labor costs involved in making confectionary products by hand. As a result, candy makers have attempted to develop equipment to minimize the use of hand formation techniques in manufacturing center-filled confections. However, the manufacturing of center-filled confectionary products in a factory, using equipment which continuously manufactures such a product, gives rise to several problems not encountered under the controlled conditions available when making candy by hand.

When making candy by hand, one "batch" of candy passes through the various steps which make up the manufacturing process one step at a time. After one step is completed, the entire batch moves on to the next step. Thus, careful and continuous monitoring of the candy is possible at all times during the manufacturing process.

When making candy in a factory, it is generally preferred to utilize a continuous manufacturing process whereby the candy is made according to an assembly line procedure. Thus, monitoring of individual batches of candy is not possible. The method utilized in the production process must therefore reliably produce a product of consistent quality.

Manufacturing a center-filled candy presents problems when a continuous manufacturing process is used. Whereas manufacturing a confectionary product which comprises only one type of candy involves mixing the ingredients and cooking the candy to obtain the desired consistency before forming the candy into the desired shape, manufacturing a center-filled candy is more difficult.

When manufacturing a center-filled candy, two separate candies must be made independent of one another and then passed through a forming process whereby the candy is formed into a confectionary rope with an outside layer of one type of candy and a center of the second type of candy. After the confectionary rope has been formed, the candy is cut into individual pieces or passed through a separate molding or forming process to form the candy into the desired shape prior to packaging.

Extreme care must be taken when simultaneously dealing with more than one type of candy because if the temperature of the candy is not carefully controlled throughout the manufacturing process, the texture and hardness of the final confectionary product may be undesirably affected.

The type of center used in the confectionary rope may also give rise to manufacturing problems. If it is desired to employ a liquid center, the candy center may be "pumped" along the manufacturing process. The temperature of the liquid center thus may easily be monitored and controlled because it is constantly enclosed within a tube. Such a liquid center may be injected into the center of a second candy to form a center-filled confectionary product.

If the candy center to be employed is too viscous to be pumped, the methods described above are inadequate. Because of its viscosity, it may not be injected into the center of a confectionary product. It must, therefore, first be molded into a predetermined shape and then coated with a second candy. In many manufacturing facilities, this process is done by hand. It will be appreciated that the manual preparation of such a center-filled confectionary rope drastically increases the costs associated with production. Additionally, the time required for production is increased thereby rendering manual production methods inadequate for producing large quantities of candy.

Another disadvantage associated with the manual production of a center-filled confectionary rope is that much candy is wasted during the process. After the confectionary rope has been formed by hand, it is fed into a rope sizer which further refines the geometric configuration of the rope. Waste occurs because when the center-filled confectionary rope is made by hand, the ends of the rope typically do not contain an adequate amount of the candy center. Thus, the cross section of the ends of the rope is not consistent with a representative cross section taken from the middle of the confectionary rope. In order to ensure a consistent cross section in the confectionary rope and a corresponding consistency in quality in the final product, it is necessary to cut off both ends of the center-filled confectionary ropes made by hand before they are introduced to the rope sizer. Because the confectionary ropes made by hand are comparatively small in length, cutting off the ends of each of these ropes results in a substantial amount of waste or the incorporation of additional steps to recover the unused candy.

Additionally, it is difficult to control the temperature of the candy when making a confectionary rope by hand. The manual forming process occurs typically under conditions such that the candy is subject to an ambient air temperature of approximately 20° to 25° C. The candy is therefore being cooled as it is being molded, thereby resulting in a constant change in various properties of the candy. The texture and hardness of the finished product often lacks the consistency desired by many candy manufacturers.

When making a center-filled candy, it may sometimes be desirable to employ an exterior coating or shell which comprises more than one type, color, or flavor of candy. Manufacturing a center-filled candy of this nature requires that at least three candies be monitored at once—the candy comprising the center and the two candies comprising the outer layer. Manufacturing such a product in a continuous manufacturing process obviously compounds the difficulties which are already present when manufacturing a center-filled candy, especially if it is desirable to employ a highly viscous candy in the center.

It will be appreciated, therefore, that what is needed in the art is an apparatus and process for forming a center-filled confectionary product having a center which is highly viscous during the forming process. It would be a further enhancement in the art if such an apparatus and process could be used to manufacture a center-filled confectionary product continuously, thereby enabling the process of the present invention to be used in combination with the equipment utilized in modern candy manufacturing facilities. It would also be an enhancement in the art if such an apparatus and process could produce such a center-filled confectionary product having a quality comparable or superior to the quality of similar confectionary products made by hand. It would be a further advancement in the art if such an apparatus and process could produce such a center-filled confectionary product more economically than those processes presently utilized by the prior art. It would be an additional enhancement in the art if such an apparatus and process could be employed to produce such a center-filled confectionary product while controlling candy temperatures, thereby preventing undesired alteration of the texture and hardness of the candy during the forming process. It would also be an advancement in the art if such an apparatus and process could be utilized to produce such a center-filled confectionary product having an exterior layer which comprises two separate candies.

Such an apparatus and process are disclosed and claimed herein.

BRIEF SUMMARY AND OBJECTS OF THE INVENTION

The present invention includes a novel apparatus and process for producing a center-filled confectionary rope wherein the center-fill candy is too viscous to be pumped during the forming process. According to the present invention, a batch roller having a plurality of rollers is used for forming the viscous candy which will become the center of the confectionary rope into a long cylindrical shape.

After the center candy has been formed into a cylindrical shape having a diameter approximately equal to the desired diameter of the center of the confectionary rope, an exterior layer of candy which has been formed into a long rectangular shape is wrapped around the center candy to form the center-filled confectionary rope.

According to one presently preferred process of the present invention, a confectionary material suitable for forming the center of the confectionary rope is first obtained. This material may be any confectionary material which, during the forming process, is too viscous to be pumped. The center candy mass is first formed by mixing together the ingredients and cooking the mixture, as needed, such that the candy is ready to be formed into the shape of the end product. The mixture is then placed into a hopper on a feeding miller. The feeding miller extracts a continuous flow of candy from the hopper, thereby enabling the candy mass to proceed along a continuous forming process.

The feeding miller directs the continuous flow of center candy into the batch roller which forms the candy into a cylindrical shape with a diameter approximately equal to the diameter of the center portion of the confectionary rope. As will be explained in more detail below, the batch roller contains a series of long cones which are placed with respect to each other to form a semi-circular cradle. The cones each rotate about their longitudinal axes. Thus, as the continuous flow of center candy is placed upon the cones within the batch roller, it is rotated by the cones thereby forming it into a cylindrical shape.

The cones are mounted on an incline such that the force of gravity assists the flow of candy along the length of the cones. Each cone is shaped in a long, generally frustoconical configuration such that as the candy flows along the length of the cones, the radius of the cylindrical shape that is formed is reduced. When the candy has reached the end of the batch roller, it has been formed into a cylindrical configuration having a diameter substantially equivalent to the diameter of the center portion of the confectionary rope.

The candy which is to comprise the exterior layer of the confectionary rope is prepared for the forming process in a manner similar to that described above. The ingredients are mixed and cooked, as needed, and the resulting candy mass is placed into a hopper on a feeding miller. The feeding miller extracts a continuous flow of exterior candy mass from the hopper in the form of a continuous rectangular sheet.

The continuous rectangular sheet of candy which is to become the outer layer of the confectionary rope is then directed into the lower end of the batch roller at a point where the center candy has been formed into a cylindrical shape having a diameter substantially equivalent to the diameter of the center of the confectionary rope. As the rectangular sheet of exterior candy is fed into the batch roller, it adheres to the center candy and is wrapped around the cylindrically shaped center candy as the center candy rotates within the batch roller. Thus, the resulting product is a center-filled confectionary rope having as its center a candy which, during the forming process, is too viscous to be pumped.

If it is desired to employ an exterior layer which consists of two different colors, flavors, or types of candies, this may be done by forming each candy to be used as an outer layer into a continuous rectangular sheet as described above. One process for coating the center candy with an exterior layer comprised of two different types of candies is to place the exterior candies side by side and follow the process described above for coating a center candy with a single candy exterior.

A second process for coating the center candy with an exterior candy comprised of two candies is to form each of the exterior candies into a continuous rectangular shape and coat the center candy first with one exterior candy in such a manner that a space is left between consecutive rotations of the exterior candy about the center candy. The second exterior candy may then be coated on the center candy to fill the space left by the first exterior candy. The resulting product is a center-filled confectionary rope having an exterior portion comprised of two different candies.

It is, therefore, a primary object of the present invention to provide an apparatus and process for manufacturing a center-filled confectionary rope which contains a candy in the center which is highly viscous during the forming process.

It is a further object of the present invention to provide an apparatus and process for producing a center-filled confectionary rope which operates in a continuous manner, thereby enabling large quantities of the confectionary rope to be produced, and further enabling the present invention to be used in combination with modern, continuously operating manufacturing equipment.

It is a further object of the present invention to provide such an apparatus and process which will produce a center-filled confectionary rope having a quality which is better and more consistent than that which is found in confectionary ropes made by hand.

It is an additional object of the present invention to provide such an apparatus and process which is more economical than those processes employed by the prior art.

It is also an object of the present invention to provide such an apparatus and process whereby control may be maintained over the temperatures of the candy during the forming process thereby preventing any undesired alteration in the texture and hardness of the candy.

It is a further object of the present invention to provide such an apparatus and process for producing a center-filled confectionary rope having two separate candies which form the exterior portion of the rope.

Other objects and advantages of the present invention will become apparent upon reading the following detailed description and appended claims, and upon reference to the accompanying drawings.

BRIEF DESCRIPTION OF THE DRAWINGS

FIG. 5 is a top view of the feeding millers connected to the batch roller according to the present invention.

FIG. 6 is a perspective view of a center-filled confectionary rope made according to the process of the present invention having an exterior candy portion made of two different types of candies. Portions of the confectionary rope have been cut away to illustrate its cross section.

DETAILED DESCRIPTION OF THE PREFERRED EMBODIMENTS

Reference is now made to the drawings wherein like parts are designated with like numerals throughout. The present invention is directed to a process for manufacturing a center-filled confectionary rope in which the center is a candy which, during the forming process, is too viscous to be pumped.

Figure 1:
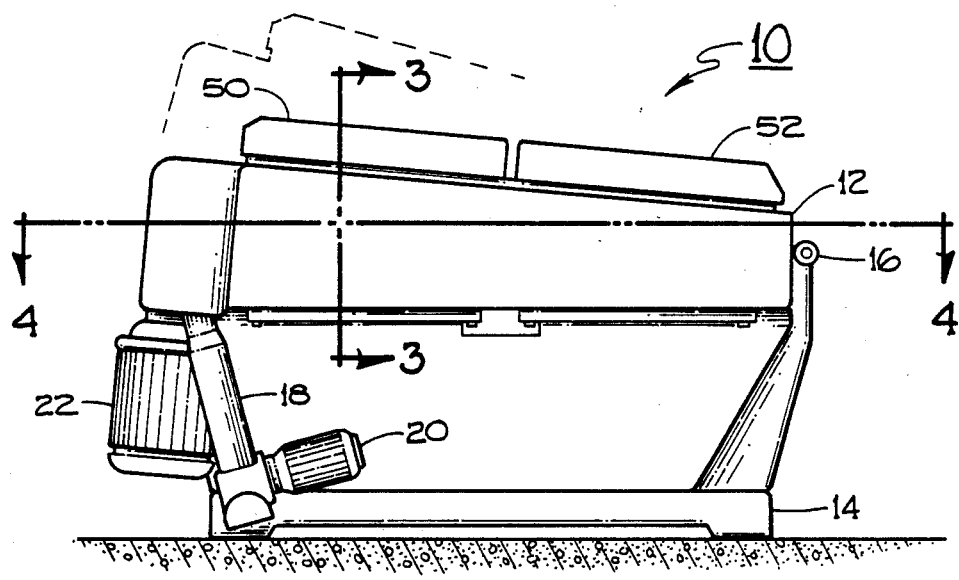
FIG. 1 is a plan view of a batch roller which forms part of the apparatus of the present invention.

FIG. 1 illustrates a batch roller used in producing the center-filled confectionary roll according to the present invention. In FIG. 1, the batch roller is generally designated at 10. Batch roller 10 comprises an outer vessel 12 which houses the internal components of the batch roller, as will be explained in more detail below. Outer vessel 12 is attached to a base 14 at one end by a hinge 16 and at the other end by an extension support 18.

Still referring to FIG. 1, extension support 18 may be extended to raise one side of vessel 12 to place the batch roller on an incline. Extension support 18 is driven by a motor 20 which may be mounted near base 14.

A motor 22 is also mounted to batch roller 10 to drive rollers (not shown in FIG. 1) within outer vessel 12 of the batch roller, as will be explained in further detail below.

Figure 2:
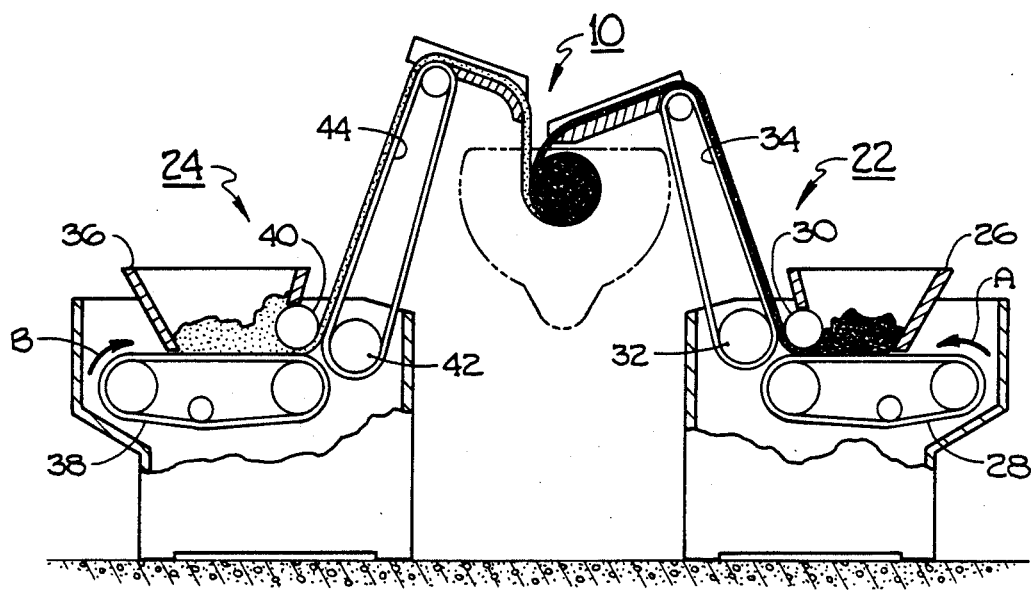
FIG. 2 is a cross-sectional view of two feeding millers of the present invention which are used to form candy masses into continuous shapes.

In FIG. 2, batch roller 10 is illustrated in combination with two feeding millers designated at 22 and 24. Feeding miller 22 includes a hopper 26 into which a candy mass may be placed. At the base of hopper 26 is a conveyer belt 28 which rotates in the direction of arrow A. Conveyer belt 28 feeds the candy mass from hopper 26 between upper roller 30 and lower roller 32.

The speed at which conveyer belt 28 operates to feed the candy mass through rollers 30 and 32 may be adjusted by the operater of feeding miller 22. The ability to adjust the speed of conveyer belt 28 assists the operator in controlling the rate at which the candy mass is fed through feeding miller 22. Additionally, the distance between rollers 30 and 32 may also be adjusted by the operator of the feeding miller. Thus, the operator may adjust both the rate at which the candy mass is fed through the feeding miller and the dimensions of the resulting candy sheet.

Still referring to FIG. 2, an inclined conveyer 34 is attached to rollers 30 and 32 such that inclined conveyer 34 carries the candy mass to batch roller 10. Feeding miller 22 is used to form the candy mass which is used as the center candy.

In FIG. 2, feeding miller 24 is illustrated for use in forming the candy mass which is to become the exterior candy. As with feeding miller 22, feeding miller 24 also contains a hopper 36 into which the candy mass may be placed. A conveyer belt 38 is attached at the base of hopper 36 and turns in the direction of arrow B, clockwise as viewed in FIG. 2.

Feeding miller 24 also includes an upper roller 40 and a lower roller 42 attached near the base of hopper 36. As with feeding miller 22, the rate at which conveyer belt 38 rotates and the distance between upper roller 40 and lower roller 42 are adjustable by the operator of the feeding miller. An inclined conveyer 44 is attached to feeding miller 24 such that it carries the candy from the rollers 40 and 42 along an incline to batch roller 10.

Figure 3:
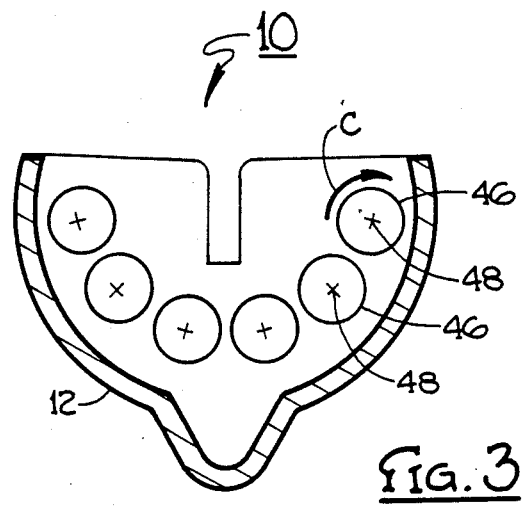
FIG. 3 is a cross-sectional view of the batch roller taken along line 3—3 of FIG. 1.
Figure 4:
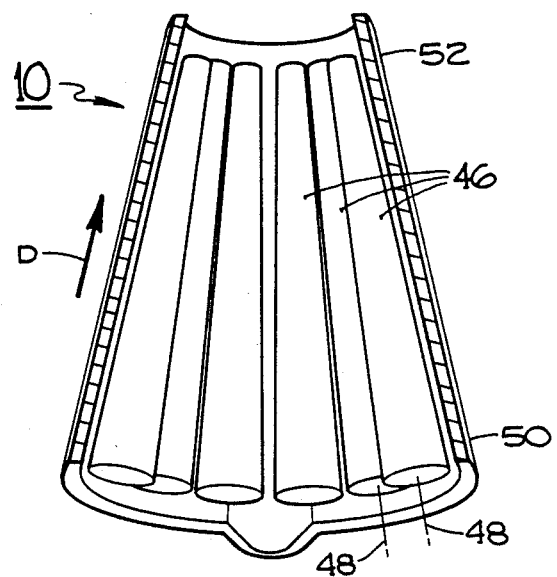
FIG. 4 is a top cross-sectional view of the batch roller taken along line 4—4 of FIG. 1.

The inner workings of the batch roller can be explained more particularly with reference to FIGS. 3 and 4. In FIG. 3, cones 46 are illustrated in cross-section and are mounted within outer vessel 12 of batch roller 10. Cones 46 are configured such that they form a semi-circular cradle within the batch roller. It is within this cradle that the candy mass rests as it proceeds through the batch roller.

Although the batch roller as illustrated in FIG. 3 contains six cones 46, batch rollers containing virtually any number of cones are suitable for the processes of the present invention. For example, some batch rollers which are conventional in the art contain four cones.

The cones within the batch roller may be heated in order to maintain the candy at a constant temperature as the candy passes through the batch roller. Maintaining control over the temperature of the candy during the forming process helps ensure that the texture and hardness of the final confectionary product are not undesirable affected.

Each of the cones is generally frustoconical in shape, as can be observed by reference to FIG. 4. The cones are mounted such that the external surface of each cone is spaced equidistant from the external surface of each adjacent cone (see FIG. 3). When so mounted, the overall configuration of the cones tapers in along the length of the cones. This tapering effect also results in a steady decrease in the radius of the semicircular cradle formed by the cones (see FIG. 4) as one proceeds from the upper end 28 to the lower end 30 of the batch roller.

Cones 46 each rotate in the same direction about an axis 48 in the same direction. In FIG. 3 the cones are illustrated as rotating in a clockwise direction, according to the direction of arrow C. By rotating in the direction of arrow C, any candy mass within the semi-circular cradle formed by cones 46 is forced to rotate in an opposite direction. Thus, the candy mass would rotate in a counterclockwise direction as viewed in FIG. 3.

In FIG. 4, batch roller 10 is illustrated in top view with portions of outer vessel 12 cut away to more particularly illustrate the configuration of rollers 46. In FIG. 4 it can be observed that cones 46 are slightly tapered such that they are configured in a substantially frustoconical shape. Thus, in FIG. 4, an upper end 50 and a lower end 52 of batch roller 10 are designated.

As more particularly illustrated in FIG. 1, upper end 50 corresponds to the end of batch roller 10 having a higher elevation. Lower end 52 corresponds to the end of the batch roller near hinge 16. As the candy travels through batch roller 10, it travels from upper end 50 to lower end 52, in the direction of arrow D.

FIG. 5 illustrates how batch roller 10 is placed in combination with feeding millers 22 and 24. In FIG. 5, feeding miller 22 is illustrated as mounted on batch roller 10 near upper end 50 of the batch roller. Feeding miller 22 contains a candy mass corresponding to a center candy 54. Feeding miller 24 is mounted on batch roller 10 near lower end 52 of the batch roller. Feeding miller 24 contains the candy mass corresponding to exterior candy 56.

It is preferable that exterior candy 56 be introduced into batch roller 10 near the point where center candy 54 is introduced into batch roller 10. For this reason, feeding miller 24 is illustrated as mounted on the opposite side of batch roller 10 from feeding miller 22. If both feeding millers were mounted on the same side of batch roller 10, the structures of the respective feeding millers would interfere thereby preventing the feeding millers from being mounted as close to each other as might otherwise be desired. To be sure, exterior candy 56 should not be introduced to batch roller 10 at the same point that center candy 54 is introduced to batch roller 10 if a center-filled confectionary rope is desired. Because of the forming function performed by batch roller 10, it is important that center candy 54 be introduced into batch roller 10 before it is covered with exterior candy 56 by the introduction of exterior candy 56 into the batch roller.

For some applications, it may be desirable to manufacture a confectionary product having two different candies "twisted" about each other. This may be accomplished by mounting feeding miller 24 directly across batch roller 10 from feeding miller 22. So mounted, as the candy from each feeding miller is directed into the batch roller, the candy will be twisted around each other thereby forming the desired product.

In the production of a center-filled confectionary rope according to the present invention, the center candy may include virtually any type, flavor, or color of candy which, during the forming process, is too viscous to be pumped. The exterior candy may likewise include various colors, flavors, or types of candies, including hard, soft or chewable candy.

The first step in the process of manufacturing the center-filled confectionary rope according to the present invention is that a first candy mass must be obtained for use as a center candy 54 and a second candy mass must be obtained for use as an exterior candy 56. The candy masses are each obtained by mixing together the ingredients which form the candy according to any of the candy recipes which are generally known in the art. Such conventional candy recipes normally require some amount of cooking before the candy is ready to be formed into its final shape.

Once the candy mass which will comprise the center of the confectionary rope is obtained, it is run through feeding miller 22, as illustrated in FIG. 1. This is done by initially placing the center candy into hopper 26. During operation, conveyor belt 28 rotates in the direction of arrow A thereby extracting a continuous flow of candy from the hopper. Conveyor belt 28 delivers the continuous flow of candy into rollers 30 and 32 which form the candy into a rectangular shape having a consistent thickness and width.

As mentioned above, the operator of the feeding millers may control the dimensions of the cross-section of the continuous flow of candy and the rate at which candy is extracted from the hopper. By maintaining control over these two parameters, the operator of the feeding miller maintains a significant degree of control over the ultimate size of the center portion of the confectionary rope.

The use of the term "continuous" is designed to reflect modern manufacturing techniques in which a confectionary product of this nature is continuously manufactured. Rather than manufacture candies in a piecemeal operation such that one "batch" of candy is produced at a time, the process of the present invention is designed for use in modern manufacturing facilities in which the processes which transform initial ingredients into a final product may be continuously in operation. It will be appreciated, however, that the processes of the present invention will also work effectively in systems in which only one "batch" of a product is prepared at a time.

After center candy 54 has been formed into a continuous rectangular shape by rollers 30 and 32, the center candy is carried up inclined conveyor belt 28 and fed into batch roller 10, as illustrated more particularly in FIG. 5.

Center candy 54 is conveyed along inclined conveyor belt 28 of feeding miller 22, as illustrated in FIG. 2. The center candy is then fed into the batch roller at its upper end 50. Upon being fed into the batch roller, the center candy is directed into the semicircular cradle formed by the cones, more particularly illustrated in FIG. 3. The rotation of the cones about their longitudinal axis causes the continuous length of center candy to rotate within the cradle formed by the cones. As the center candy rotates, the interaction between the center candy and the cones transforms the center candy from the substantially rectangular shape it had upon exiting the feeding miller into a substantially cylindrical shape.

The center candy progresses down the length of the batch roller, as assisted by the force of gravity, towards lower end 52 of batch roller 10. As the center candy travels along the length of the batch roller, the cones smooth and taper the center candy such that the center candy is formed into a cylindrical configuration which has a diameter substantially equivalent to the diameter of the center portion of the confectionary rope. At this point the center candy is ready to be coated with exterior candy 56 to form the confectionary rope.

The candy which is to comprise the exterior candy 56 is prepared according to any of those recipes conventionally known in the art of candy making. Similar to center candy 54, exterior candy 56 is placed within hopper 36 of feeding miller 24, as can be seen by reference to FIG. 2. Rollers 40 and 42 are provided on the feeding miller through which a continuous flow of exterior candy 54 in the form of a rectangular configuration is extracted.

The continuous rectangularly shaped exterior candy should be formed to have a thickness at least equal to the desired thickness of the exterior layer as it will ultimately appear on the confectionary rope. Although the length of the exterior candy may be virtually any size, as mentioned above, it is generally referred to herein as being "continuous" because of the continuous nature of the preferred manufacturing process.

After the exterior candy has been formed into a continuous rectangular shape by the feeding miller, it travels up inclined conveyor 44. At this point it is ready to be introduced into batch roller 10 to be wrapped around the center candy.

The exterior candy 56 is wrapped around center candy 54 by introducing exterior candy 56 into batch roller 10 at a point near lower end 52 of the batch roller. When the center candy has reached the lower end of the batch roller, it has been sized by the cones within the batch roller to substantially the dimensions which are desired for the center of the confectionary rope. With reference now to FIG. 5, as the exterior candy is directed into the batch roller near lower end 52 of the batch roller, the end of the rectangularly shaped exterior candy is attached to the side of the cylindrically shaped center candy. Because the center candy is rotating within the batch roller, the continuous flow of rectangularly shaped exterior candy begins to wrap around the continuous cylindrically shaped center candy thereby coating the center candy with the exterior candy.

Once the continuous flow of candy has begun to proceed through the batch roller, the candy is substantially selfguided as it enters the batch roller from the feeding millers. Because the production of a confectionary rope according to the present invention is preferably done in a continuous manner, there is no need for an apparatus donfigured specifically to guide the candy into its proper position within the batch roller.

As the center candy rotates within the batch roller, it is also advancing along the length of the batch roller. The exterior candy is wrapped around the center candy in a helical fashion; that is, the exterior candy is "coiled" around the center candy as the center candy advances along the length of the batch roller. The resulting configuration is that the continuous rectangularly shaped exterior candy is wrapped around the cylindrically shaped center candy at a constant oblique angle.

To prevent the exterior candy from overlapping upon itself as it is coated onto the center candy, the center candy should advance a distance of approximately the width of the exterior candy with each rotation of the center candy within the batch roller. Under some conditions it may be desirable to allow some degree of overlap as the exterior candy is coated onto the center candy.

For example, if the rectangularly shaped exterior candy is particularly thin, it may be desirable to build up the exterior layer on the confectionary rope by allowing for a 50 percent overlap of the exterior layer upon itself as it is coated onto the center candy. Such an overlap would result in effectively doubling the thickness of the exterior coating of candy on the confectionary rope. A 50 percent overlap may be obtained simply by adjusting the flow rate of the center candy through the batch roller relative to the width of the exterior candy. A 50 percent overlap will result if the flow rate is adjusted such that in the time required for one rotation of the center candy within the batch roller, the center candy advances a longitudinal distance equal to one-half of the width of the rectangularly shaped exterior candy.

Referring still to FIG. 5, after the center candy has been coated with the exterior candy, the resulting confectionary rope exists the batch roller and is introduced to a rope sizer 58. The rope sizer serves to further refine the geometry of the confectionary rope thereby insuring that the rope has a consistent diameter.

The confectionary rope may then be introduced to a forming machine 60 which takes the continuous cylindrically shaped confectionary rope and forms it into any of a variety of geometrical configurations. Because candies of this nature are often commercially distributed in various sizes and shapes, the forming machine cuts the confectionary rope into the desired lengths and forms the resulting segments into any of a variety of geometrical configurations which have as their basic design a center-filled confectionary product.

The individual candies may then introduced to a cooler 62 such as any of those conventionally known in the art, which allows the candies to cool to the desired temperature prior to packaging.

The present invention also allows two different candies to be employed as an exterior layer. As is illustrated in FIG. 6, a first exterior candy 64 and a second exterior candy 66 are shown wrapped around a center candy 68. For example, it may be desirable to use two candies which are identical in taste but differ in color to coat the center candy, thereby adding to the appearance of the final product. It may also be desirable to employ exterior candies in complimentary flavors or textures.

One embodiment of the present invention which may be employed to coat two exterior candies upon a center candy is to provide a second feeding miller in which a second exterior candy could be placed. The second exterior candy is first formed into a continuous rectangular shape, as described above, and then introduced into the batch roller such that it is adjacent and parallel to the first exterior candy. The exterior candies are combined to form one continuous rectangularly shaped candy and are then wrapped around the center candy, with or without overlap, in a helical fashion substantially as described above.

Alternatively, a center-filled confectionary rope may be formed having only one exterior candy according to the process described above. The rope may then be coated with the second exterior candy by following the same procedure; that is, treating the already formed confectionary rope as the "center candy" and coating it with the second exterior candy according to the processes already described. Coating the confectionary rope with the second exterior candy may be done by introducing the second exterior candy into the batch roller at a point below where the first exterior candy is introduced or by employing a second batch roller after the first batch roller.

It may be preferred to completely cover the center candy with the first exterior candy and then cover the resulting confectionary rope, either entirely or partially, with the second exterior candy. Alternatively, it may be desirable to cover the center candy in a helical fashion with the first exterior candy such that a space remains between successive "coils" of the helix into which the second exterior candy may be placed, resulting in a configuration as depicted in FIG. 6.

From the foregoing, it will be appreciated that the present invention provides a unique method and apparatus for manufacturing a center-filled confectionary rope which contains candy in the center which is highly viscous during the forming process. This is achieved by forming the viscous center candy into a continuous cylindrical shape and wrapping it with an exterior candy which has been formed into continuous rectangular shape in a helical fashion.

In addition, the present invention provides an apparatus and process for the manufacture of a center-filled confectionary rope in a continuous manner, thereby enabling the process of the present invention to be used in combination with modern manufacturing facilities. The feeding millers enable a continuous supply of the continuous rectangular shaped exterior candy to be delivered to the batch roller to be coated onto the center candy. Additionally, a continuous supply of the viscous center candy is also supplied thereby enabling the center-filled confectionary rope to be produced continuously.

Using the apparatus and process of the present invention, the flow rate and dimensions of the exterior candy and the center candy may be maintained at constant levels thereby ensuring that the center-filled confectionary rope produced according to the present invention is of a higher and more consistent quality than those confectionary ropes conventionally produces by other existing techniques.

Additionally, the apparatus and process of the present invention provides for the manufacture of a center-filled confectionary rope to be conducted in a manner more economical than those processes employed by the prior art. The continuous process of the present invention reduces to a minimum the amount of waste associated with the production of such a confectionary rope.

The apparatus and process of the present invention allows for the control and maintenance of candy temperatures during the forming process thereby preventing undesired alteration in the texture and hardness of the candy. Control of temperatures is obtained by employing apparatus which may be maintained at a constant temperature while performing the forming process on the candy.

Finally, the present invention provides an apparatus and process for producing a center-filled confectionary rope having two candies which form the exterior portion of the rope. By employing an additional feeding miller, additional external layers of candy may be added to the confectionary rope.

It will be appreciated that the apparatus and process of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. An apparatus for forming a confectionary rope having a viscous candy center-fill and a semi-solid candy outer layer, comprising:
   an inclined elongated cradle having an upper end and a lower end and having a plurality of rotatable frustoconical rollers arranged to extend substantially in the machine direction in side-by-side relationship with their respective narrow portions at the lower end of said cradle to provide continuous arcuate contact with a moldable mass passing through said cradle;
   a first feed assembly for delivering said center-fill to said cradle near said upper end;
   means for rotating said rollers to form said center-fill into a cylindrical shape and to rotate said center-fill in said cradle as said center-fill progresses down said inclined cradle; and
   a second feed assembly positioned near said lower end for inserting a portion of said outer layer between said rollers and said cylindrically formed center-fill as said center-fill rotates in said cradle.

2. An apparatus for forming a confectionary rope as defined in claim 1, wherein said inclined cradle is semi-circular in shape.

3. An apparatus for forming a confectionary rope as defined in claim 1, wherein said first feed assembly comprises means to form said center-fill into a continuous rectangular shape.

4. An apparatus for forming a confectionary rope as defined in claim 3, wherein said means to form said center-fill into a continuous rectangular shape comprises a pair of rollers spaced a predetermined distance apart and a conveyor belt for delivering a continuous flow of said center-fill to said rollers.

5. An apparatus for forming a confectionary rope as defined in claim 4, wherein said rollers are mounted such that said predetermined distance may be modified by an operator of said first feed assembly.

6. An apparatus for forming a confectionary rope as defined in claim 4, wherein said conveyor belt is configured such that the rate at which said conveyor belt delivers said center-fill to said rollers may be modified by an operator of said first feed assembly.

7. An apparatus for forming a confectionary rope as defined in claim 1, wherein said second feed assembly comprises means to form said outer layer into a continuous rectangular shape.

8. An apparatus for forming a confectionary rope as defined in claim 7, wherein said means to form said outer layer into a continuous rectangular shape comprises a pair of rollers spaced a predetermined distance apart and a conveyor belt for delivering a continuous flow of said outer layer to said rollers.

9. An apparatus for forming a confectionary rope as defined in claim 8, wherein said rollers are mounted such that said predetermined distance may be modified by an operator of said second feed assembly.

10. An apparatus for forming a confectionary rope as defined in claim 9, wherein said conveyor belt is configured such that the rate at which said conveyor belt delivers said outer layer to said rollers may be modified by an operator of said second feed assembly.

11. An apparatus for forming a confectionary rope as defined in claim 1, wherein said first feed assembly and said second feed assembly are attached to said elongated cradle such that said first feed assembly is on an opposite side of said cradle as said second feed assembly.

* * * * *